US012646858B2

(12) United States Patent
Bao et al.

(10) Patent No.: US 12,646,858 B2
(45) Date of Patent: Jun. 2, 2026

(54) RADIATING ELEMENT, ANTENNA ARRAY, AND NETWORK DEVICE

(71) Applicant: HUAWEI TECHNOLOGIES CO., LTD., Guangdong (CN)

(72) Inventors: Han Bao, Dongguan (CN); Fangjun Qin, Shenzhen (CN); Di Xue, Dongguan (CN); Yong Shao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 18/302,009

(22) Filed: Apr. 18, 2023

(65) Prior Publication Data

US 2023/0261391 A1 Aug. 17, 2023

Related U.S. Application Data

(63) Continuation of application No. PCT/CN2020/125231, filed on Oct. 30, 2020.

(51) Int. Cl.
*H01Q 21/06* (2006.01)
*H01Q 21/26* (2006.01)

(52) U.S. Cl.
CPC ........... *H01Q 21/062* (2013.01); *H01Q 21/26* (2013.01)

(58) Field of Classification Search
None
See application file for complete search history.

(56) References Cited

U.S. PATENT DOCUMENTS

| | | | |
|---|---|---|---|
| 2014/0266940 A1 | 9/2014 | Vale | |
| 2017/0264021 A1* | 9/2017 | Heyde | H01Q 9/285 |

FOREIGN PATENT DOCUMENTS

| | | |
|---|---|---|
| CN | 204067581 U | 12/2014 |
| CN | 105552519 A | 5/2016 |
| CN | 207116700 U | 3/2018 |
| CN | 109103592 A | 12/2018 |
| CN | 110098478 A | 8/2019 |
| JP | 2002534826 A | 10/2002 |
| JP | 2006033298 A | 2/2006 |
| WO | 2020119657 A1 | 6/2020 |

OTHER PUBLICATIONS

Dong-Ze Zheng et al: "A wideband dual-polarized antenna for base station applications", 2016 IEEE International Conference on Computational Electromagnetics (ICCEM), IEEE, Feb. 23, 2016, total 4 pages.

* cited by examiner

*Primary Examiner* — Jany Richardson

(57) ABSTRACT

This disclosure provides a radiating element, an antenna array, and a network device, to improve polarization self-isolation inside a dipole in an antenna, and improve radiation performance of the antenna. The radiating element includes at least one dipole and a reflection plate, where the at least one dipole is disposed on a surface of the reflection plate; and each of the at least one dipole includes a radiation surface, the radiation surface includes a plurality of metal sheets forming a ring shape, at least two of the metal sheets of the at least one dipole are covered with a metal protrusion structure, and a length of the metal protrusion structure is less than lengths of the covered metal sheets.

14 Claims, 6 Drawing Sheets

RADIATING ELEMENT, ANTENNA ARRAY, AND NETWORK DEVICE

CROSS-REFERENCE TO RELATED APPLICATIONS

This application is a continuation of International Application No. PCT/CN2020/125231, filed on Oct. 30, 2020, the disclosure of which is hereby incorporated by reference in its entirety.

TECHNICAL FIELD

This disclosure relates to the communication field, and in particular, to a radiating element, an antenna array, and a network device.

BACKGROUND

In mobile communication, a base station antenna usually uses a dual-polarized antenna to form polarization diversity, to reduce signal attenuation caused by multipath fading. For the dual-polarized antenna, an order of magnitude of polarization isolation indicates a degree of mutual interference between two polarized antennas perpendicular to each other. As a result, an overall data throughput is affected. Therefore, it is important to improve overall polarization isolation of the base station antenna.

SUMMARY

This disclosure provides a radiating element, an antenna array, and a network device, to improve polarization self-isolation inside a dipole in an antenna, and improve radiation performance of the antenna.

According to a first aspect, this disclosure provides a radiating element, including at least one dipole and a reflection plate, where the at least one dipole is disposed on a surface of the reflection plate; and each of the at least one dipole includes a radiation surface, the radiation surface includes a plurality of metal sheets forming a ring shape, at least two of the metal sheets of the at least one dipole are covered with a metal protrusion structure, and a length of the metal protrusion structure is less than lengths of the covered metal sheets.

Therefore, in this implementation of this disclosure, the metal protrusion structure may be added to the metal sheets of the radiation surface of the dipole, to change a width of a metal arm or a radiation ratio, so that an amplitude, a phase, or the like of a polarization isolation vector of the dipole is changed. In this way, polarization isolation of the dipole can be changed, so that polarization isolation of the dipole can be improved.

In a possible implementation, the metal protrusion structure covered on the at least one dipole is obtained through integral molding. Therefore, this embodiment of this disclosure provides a manner of disposing the metal protrusion structure.

In a possible implementation, the metal protrusion structure covered on the at least one dipole is a metal patch. Therefore, this embodiment of this disclosure provides another manner of disposing the metal protrusion structure.

In a possible implementation, the at least one dipole includes four ring structures formed by the plurality of metal sheets, and the four ring structures are pairwise opposite. Therefore, in this embodiment of this application, each dipole may include four ring structures, so that a dual-polarized dipole is implemented.

In a possible implementation, the four ring structures form two polarization directions perpendicular to each other, the two polarization directions are not parallel to the metal sheets of the four ring structures, the four ring structures include a first ring structure and a second ring structure, the metal protrusion structure is disposed on both a first metal sheet in the first ring structure and a second metal sheet in the second ring structure, and the first metal sheet is adjacent to the second metal sheet.

In this implementation of this disclosure, the dipole may form ±45° polarization, and there is a gap between ring structures, where the gap may form a cross structure. When the polarization direction crosses the cross structure formed by the gap between the ring structures, the metal protrusion structure may be disposed on adjacent metal sheets in the dipole. For example, the metal protrusion structure may be added to metal sheets on which two radiation arms in one polarization direction are located, to change a phase or an amplitude of a polarization isolation vector, so that polarization isolation is increased.

In a possible implementation, the four ring structures form two polarization directions perpendicular to each other, the four ring structures include metal sheets parallel to the two polarization directions, the four ring structures include a third ring structure and a fourth ring structure, the third ring structure and the fourth ring structure are not adjacent to each other, the metal protrusion structure is disposed on a third metal sheet and a fourth metal sheet in the third ring structure, the metal protrusion structure is disposed on a fifth metal sheet and a sixth metal sheet in the fourth ring structure, and a vertex angle formed by the third metal sheet and the fourth metal sheet is opposite to a vertex angle formed by the fifth metal sheet and the sixth metal sheet.

Therefore, in this implementation of this disclosure, the dipole may form ±45° polarization, and there is a gap between ring structures, where the gap may form a cross structure. When the polarization direction coincides with the cross structure formed by the gap between the ring structures, or all directions are parallel or nearly parallel, the metal protrusion structure may be disposed on metal sheets corresponding to a vertex angle between two ring structures in the dipole, to change a phase or an amplitude of a polarization isolation vector, so that polarization isolation is increased.

In a possible implementation, the length of the metal protrusion structure is within a range of 0.1 to 0.25 times of a wavelength corresponding to a center frequency of the radiating element, and a height of the metal protrusion structure is within a range of 1 to 2 times of thicknesses of the covered metal sheets. Therefore, in this implementation of this disclosure, the added metal protrusion structure does not affect a size structure of the dipole, and self-isolation of the dipole is improved without affecting radiation performance of the dipole.

In a possible implementation, each dipole further includes a feeding structure, four metal sheets included in each ring structure are connected to the reflection plate by using the feeding structure, and the feeding structure is for transmitting an electrical signal.

According to a second aspect of this disclosure, an antenna array is provided, including a reflection plate and at least two radiating elements, where the at least two radiating elements are arranged on the reflection plate, and the at least two radiating elements may include the radiating element according to any one of the first aspect or the optional implementations of the first aspect.

In this embodiment of this disclosure, an antenna may include a reflection plate and a plurality of radiating elements. The reflection plate may be configured to reflect an electromagnetic wave. A dipole arm of each dipole on the radiating element is covered with a periodic structure, and the periodic structure may change an equivalent dielectric constant or an equivalent magnetic permeability of the dipole, so that the electromagnetic wave radiated to the dipole can generate diffraction. In this way, the electromagnetic wave can be transmitted from one side of the dipole to the opposite side. This reduces change of a direction of the electromagnetic wave radiated to the dipole, and improves radiation performance.

Optionally, in some possible implementations, the at least two radiating elements include a first radiating element and a second radiating element.

An operating frequency band of the first radiating element is different from an operating frequency band of the second radiating element.

In this embodiment of this disclosure, the antenna may include the first radiating element and the second radiating element, and operating frequency bands of the first radiating element and the second radiating element may be different, so that the antenna can simultaneously radiate electromagnetic waves of different frequency bands.

According to third aspect of this disclosure, a network device is provided. The network device may include the radiating element according to any one of the first aspect or the optional implementations of the first aspect.

In this embodiment of this disclosure, the radiating element may include one or more dipole arms and a supporter. The dipole arms may cover with a periodic structure. The periodic material is made of an electromagnetic material, and a gap exists in the periodic structure. The periodic structure may change at least one of an equivalent dielectric constant or an equivalent magnetic permeability of the dipole for an electromagnetic wave incident to the dipole, so that an electromagnetic wave radiated to a first surface of each dipole is incident to a second surface of the dipole. Therefore, according to the radiating element provided in this embodiment of this disclosure, when an electromagnetic wave radiated by another dipole is received, the electromagnetic wave may be normally incident in a diffraction manner, to reduce shielding of the radiated electromagnetic wave, so that distortion of a radiation direction caused by shielding of the dipole can be avoided, and radiation performance of the antenna can be improved.

DESCRIPTION OF EMBODIMENTS

This disclosure provides a radiating element, an antenna array, and a network device, to improve polarization self-isolation inside a dipole in an antenna, and improve radiation performance of the antenna.

The network device provided in this disclosure may be various devices having a wireless receiving or sending function. The network device may be a base station, another device that needs to use an antenna, or the like. More specifically, the base station may be a macro base station, a micro base station, a hotspot (pico), a home base station (femeto), a transmission point (TP), a relay (Relay), an access point (Access Point, AP), or the like. The base station may be an eNodeB (eNodeB, eNB) in long term evolution (long term evolution, LTE), a gNodeB (gNodeB, gNB) in new radio (New Radio, NR), or the like.

Further, the network device may be used in various wireless communication systems, for example, a base station (base station, BS) in a global system for mobile communications (global system for mobile communications, GSM), a wideband code division multiple access (wideband code division multiple access, WCDMA) mobile communication system, an LTE system, or an NR system, and may be further used in a communication system using a future communication network, for example, a 6G network or a 7G network. More specifically, the network device may be further used in ultra-reliable low-latency communication (Ultra-Reliable and low latency communications, URLLC) in 5G, may support massive machine type communication (massive machine type communication, mMTC), and may be further used in a mobile broadband (mobile broadband, MBB) service, or the like.

Figure 1:
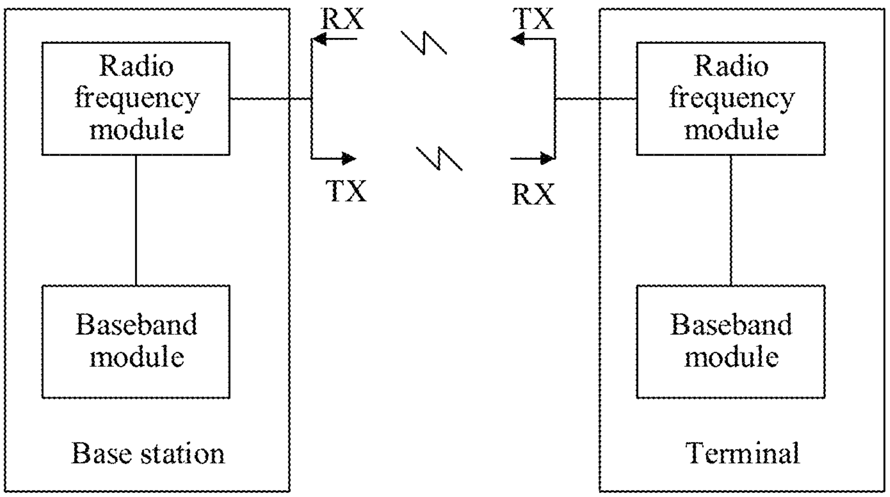
FIG. 1 is a schematic diagram of an application scenario according to an embodiment of this disclosure.

For example, communication between a base station and a terminal is used as an example for description. FIG. 1 is a schematic diagram of an application scenario according to an embodiment of this disclosure.

Wireless data transmission is performed between the base station and the terminal. A baseband module may convert to-be-transmitted data into a baseband signal, and then radiate the baseband signal through an antenna array of a radio frequency module. The baseband module may further decode a signal received by an antenna, to obtain a digital signal and the like. The base station and the terminal each may include a radio frequency module and a baseband module, to implement data transmission between the base station and the terminal. The terminal may send an uplink signal through the radio frequency module and may receive a downlink signal sent by the base station.

The network device provided in this disclosure may include one or more antenna arrays, where one antenna array may include a plurality of radiating elements. Usually, polarization isolation of the antenna greatly affects a data throughput of the antenna. In some scenarios, a current path is added, so that a current path in a main polarization direction is lengthened, and a current path in a vertical cross polarization direction is reduced. In this way, an excited cross-polarization current is small, so that isolation of a unit is improved. However, the antenna unit structure can improve polarization isolation, but is more complex. Consequently, this increases processing and manufacturing difficulty and industrial costs. Therefore, this disclosure provides a radiating element for improving polarization isolation of a dipole, which has low implementation difficulty and low industrial costs The antenna array provided in this disclosure may include one or more radiating elements. When the antenna array includes a plurality of radiating elements, operating frequency bands of the plurality of radiating elements may be the same or different. For example, the plurality of radiating elements may include two radiating elements, and operating frequency bands of the two radiating elements may be the same or different. The antenna array may further include a reflection plate in addition to the radiating element, and the reflection plate may be configured to radiate an electromagnetic wave. The plurality of radiating elements may be arranged on the reflection plate. In other words, each radiating element has a corresponding reflection plate, and is disposed on the corresponding reflection plate. For example, the antenna array may be an antenna array in which high frequency dipoles and low frequency dipoles coexist, where the antenna array includes six rows and four columns of high frequency dipoles and three rows and two columns of low frequency dipoles, and the high frequency dipoles may be arranged around the low frequency dipoles.

Figure 2:
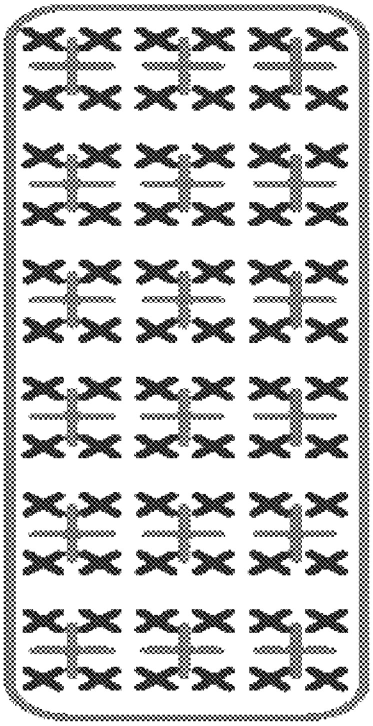
FIG. 2 is a schematic diagram of a structure of an antenna array according to an embodiment of this disclosure.

For example, a structure of the antenna array may be shown in FIG. 2. “x” may represent a high frequency dual-polarized antenna dipole, and “+” may represent a low frequency dual-polarized antenna dipole. The high frequency dipole and the low frequency dipole are closely arranged around the low frequency dipole. Usually, a size of an antenna is related to a wavelength of a supported frequency band. A larger wavelength indicates a larger antenna size. Therefore, a size of the low frequency antenna dipole may be greater than a size of the high frequency antenna dipole, and the low frequency dipole may shield an electromagnetic wave radiated by the high frequency dipole. This affects a radiation direction of the high frequency dipole, and further affects radiation performance of the high frequency dipole.

It should be noted that, in this disclosure, a high frequency and a low frequency are relative to each other, and the high frequency is higher than the low frequency. Usually, a frequency greater than a frequency threshold may be understood as the high frequency, and a frequency not greater than the frequency threshold may be understood as the low frequency. For example, a frequency band ranging from 690 MHz to 960 MHz may be understood as a low frequency band, and a frequency band ranging from 1700 MHz to 2700 MHz may be understood as a high frequency band. A range of the high frequency and a range of the low frequency may be adjusted based on an actual application scenario. This is not limited herein.

According to the radiating element provided in this disclosure, metal protrusion may be disposed on a part of metal sheets of a radiation surface of a dipole, so that a metal arm of the radiating element is partially widened, and polarization isolation of the radiating element is improved. This reduces interference between the dipoles, and improves radiation performance of an antenna. The radiating element may be used in the foregoing network device or antenna array, to improve radiation performance of the network device or antenna array.

The following separately describes the radiating element, the antenna array, the network device, and the like provided in this disclosure.

The radiating element provided in this disclosure may include at least one dipole and a reflection plate, where the at least one dipole is disposed on a surface of the reflection plate; and each of the at least one dipole includes a radiation surface, the radiation surface includes a plurality of metal sheets forming a ring shape, at least two of the metal sheets of the at least one dipole are covered with a metal protrusion structure, a length of the metal protrusion structure is less than lengths of the covered metal sheets, and a protrusion height of the metal protrusion structure is greater than 0.

Therefore, in this implementation of this disclosure, the metal protrusion structure is added to the metal sheets on the radiation surface of the dipole, so that a metal arm of the radiating element is partially changed, and a phase or an amplitude of an active self-isolation vector of the dipole is changed. For example, the amplitude of the active self-isolation vector is increased. This improves polarization self-isolation of the dipole, polarization self-isolation of an antenna, and radiation performance of the antenna. It may be understood that an additional stub is loaded on the radiation surface of the dipole, so that a radiating metal arm is partially widened, and an amplitude or a phase of a polarization isolation vector of the dipole is changed. This can improve an order of magnitude of the polarization isolation of the dipole, thereby improving polarization self-isolation of the dipole. An improved technology for self-isolation of a dual-polarized antenna (base station antenna) element and a dual-polarized antenna array is provided. A metal stub or a slot structure is loaded on a specific metal part of the radiation surface of the element, to improve self-isolation of the element and an order of magnitude of self-isolation of the array.

The metal sheet or the metal protrusion structure may be a structure formed by a metal, or may be a structure obtained by covering a metal coating on a substrate. This may be specifically adjusted based on an actual application scenario. In addition, a length of the metal protrusion structure is not greater than a length of the metal sheet. In this way, polarization self-isolation of the antenna is improved while radiation performance of the antenna is maintained.

Figure 3:
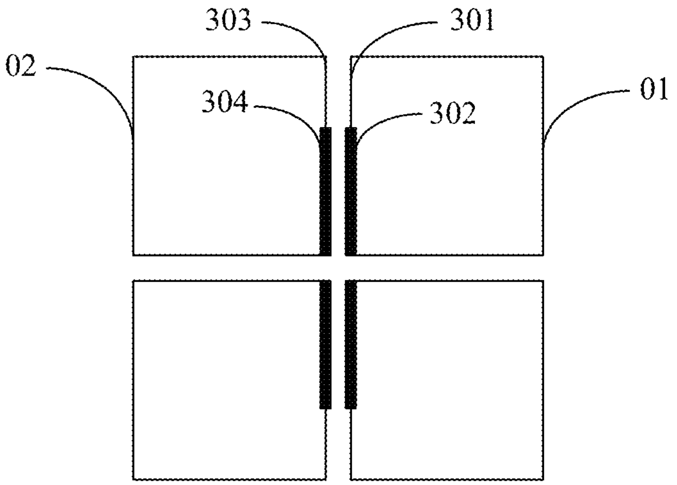
FIG. 3 is a schematic diagram of a structure of a radiating element according to an embodiment of this disclosure.

For example, each radiating element may include a plurality of ring metal structures, and the ring metal structures are disposed on a reflection plate. A radiation surface of the radiating element may be shown in FIG. 3. The radiating element may include a plurality of radiation surfaces, and each radiation surface may include a square ring formed by a metal sheet. A reflection plate is disposed under a radiation surface and is parallel to the radiation surface shown in FIG. 3. Alternatively, in other words, the radiating element includes one radiation surface, and the radiation surface includes a square ring formed by a plurality of metal sheets. For ease of understanding, an example in which the radiating element includes the plurality of radiation surfaces is used for description in this disclosure. Two radiation surfaces 01 and 02 are used as an example. The radiation surface 01 includes a metal sheet 301, and a metal protrusion structure 302 is disposed on the metal sheet 301. The radiation surface 02 includes a metal sheet 303, and a metal protrusion structure 304 is disposed on the metal sheet 303. Therefore, polarization isolation of a dipole is improved through metal protrusion disposed on a metal ring. For example, an amplitude of an order of magnitude of polarization isolation may be increased, to increase the order of magnitude of polarization isolation.

Optionally, a metal protrusion structure disposed on a metal sheet may be integrally formed when the metal sheet is prepared, or the metal protrusion structure may be a metal patch covering the metal sheet. It may be understood that the radiating element provided in this disclosure may be implemented in a plurality of manners. A partial width of a radiating metal arm may be increased in an integrated molding manner or a metal patch manner, to improve polarization self-isolation of the dipole.

Optionally, a length of the metal protrusion structure is within a range of times of a wavelength corresponding to a center frequency of the radiating element. For example, the length of the metal protrusion structure is within a range of 0.1 to 0.25 times of the wavelength corresponding to the center frequency of the radiating element. For example, if the center frequency of the radiating element is 960 MHz, the length of the metal protrusion structure covering the metal sheet may be within a range of 0.1 to 0.25 times of a wavelength corresponding to 960 MHz. The length of the metal protrusion structure may be a length in a direction of the metal arm formed by the metal sheet. Therefore, in this implementation of this disclosure, the added metal protrusion structure does not affect a size structure of the dipole, and self-isolation of the dipole is improved without affecting radiation performance of the dipole.

Optionally, a height of the metal protrusion structure is within a range of times of thicknesses of the covered metal sheets. For example, a height of the metal protrusion structure relative to a height of metal sheet protrusion is within a range of 1 to 2 times of a range of times of the thicknesses of the covered metal sheets. A width of the metal protrusion structure may be a height in a direction perpendicular to the metal arm formed by the metal sheet. Therefore, in this implementation of this disclosure, the added metal protrusion structure does not affect a size structure of the dipole, and self-isolation of the dipole is improved without affecting radiation performance of the dipole.

Figure 4:
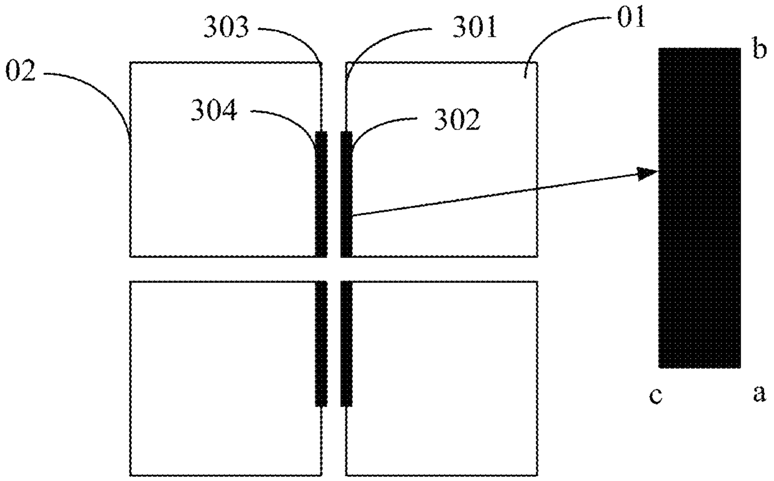
FIG. 4 is another schematic diagram of a structure of a radiating element according to an embodiment of this disclosure.

For example, a partially enlarged metal protrusion structure may be shown in FIG. 4. A length of the metal protrusion structure may be a length of ab shown in FIG. 4, and ab is parallel to a metal sheet 301. A height of the metal protrusion structure may be ac shown in FIG. 4, and ac is perpendicular to the metal sheet 301.

In a possible implementation, each dipole further includes a feeding structure, four metal sheets included in each dipole are connected to the reflection plate by using the feeding structure, and the feeding structure is for transmitting an electrical signal. Usually, if the dipole is a dual-polarized dipole, the corresponding feeding structure may be divided into two parts, respectively forming pathways in different polarization directions.

Figure 5A:
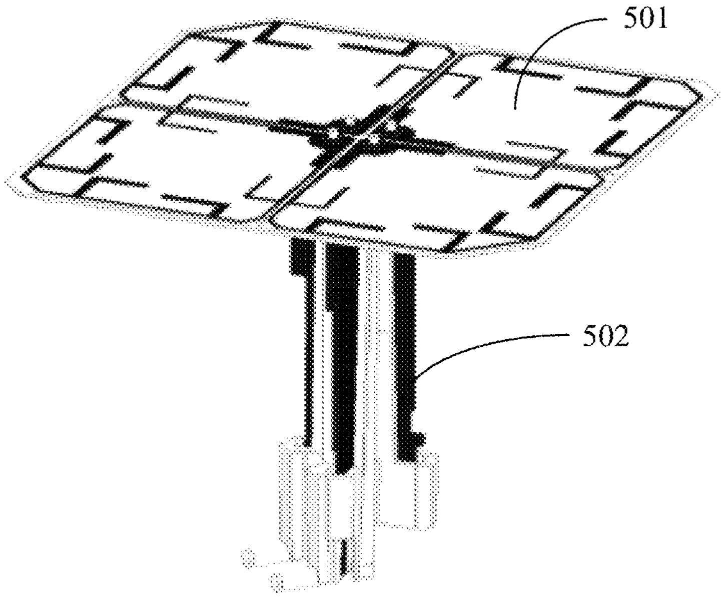
FIG. 5A is another schematic diagram of a structure of a radiating element according to an embodiment of this disclosure.

For example, a structure of an antenna may be shown in FIG. 5A. A dipole 501 is disposed on the top of a feeding structure 502, and the dipole 501 may be disposed on the top of the feeding structure 502 through electrical connection, clamping connection, fixed connection, or the like. A metal arm or a radiation arm of a part of metal sheets is widened, which is equivalent to adding a metal stub. The feeding structure 502 is fixed on a reflection plate (not shown in FIG. 5A). The feeding structure 502 is disposed at a top corner of four metal rings disposed oppositely to each other, to form a cross structure. The reflection plate may be a printed circuit board (printed circuit board, PCB), or may be understood as a substrate. The reflection plate may be configured to radiate an electromagnetic wave signal. Usually, the reflection plate may be formed by a metal or a PCB including a metal coating. The reflection plate may include a plurality of layers, for example, one or more a metal layer, a dielectric layer, a conductive layer, or a ground layer.

Figure 5B:
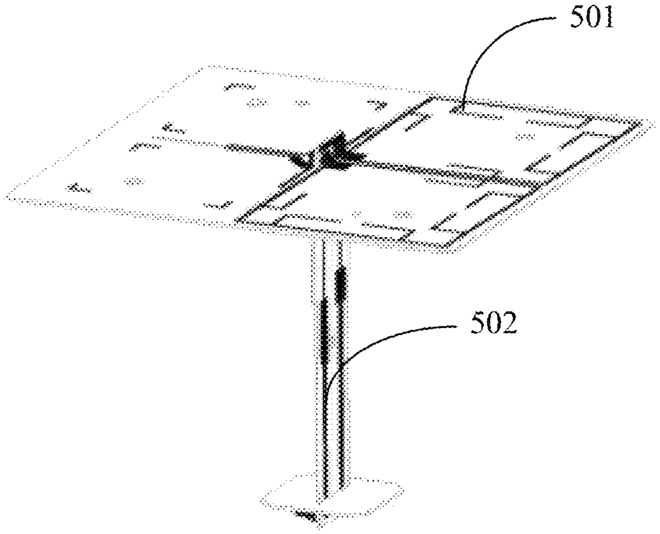
FIG. 5B is another schematic diagram of a structure of a radiating element according to an embodiment of this disclosure.

For example, another structure of an antenna may be shown in FIG. 5B. A dipole 501 is disposed on the top of a feeding structure 502, and the dipole 501 may be disposed on the top of the feeding structure 502 through electrical connection, clamping connection, fixed connection, or the like. The structure of the radiating element is similar to that in FIG. 5A, and a difference lies only in that a shape of the feeding structure 502 is a sheet-like structure.

Usually, each of the foregoing dipoles may include a plurality of ring structures formed by metal sheets. In this embodiment of this disclosure, four ring structures are used as an example for description. The following four ring structures may alternatively be replaced with more or fewer ring structures. This may be specifically adjusted based on an actual application scenario. This is merely an example for description and is not limited in this disclosure.

It should be noted that the ring structure provided in this disclosure may be a regular or an irregular quadrilateral, hexagonal, or octagonal structure, and may be specifically adjusted based on an actual application scenario. In the following embodiments of this disclosure, a square ring is used as an example for description, or may be replaced with a hexagonal structure, an octagonal structure, or the like. This is not limited.

In a possible implementation, the four ring structures form two polarization directions perpendicular to each other, the two polarization directions are not parallel to the metal sheets of the four ring structures, the four ring structures include a first dipole and a second dipole, the metal protrusion structure is disposed on both a first metal sheet in the first dipole and a second metal sheet in the second dipole, and the first metal sheet is adjacent to the second metal sheet.

For example, in some common scenarios, the radiating element may be a dual-polarized antenna. For example, a radiation surface is used as a horizontal plane. The two polarization directions may be perpendicular to each other, and a diagonal of the radiation surface of the dipole may be parallel to or nearly parallel to one of the polarization directions. A metal protrusion structure may be disposed on two metal sheets adjacent to the two dipoles. Usually, a location of a metal sheet on which the metal protrusion structure is disposed is related to a polarization direction. For example, the metal protrusion structure may be added to a metal sheet on which two radiation arms in one polarization direction are located, to change a phase or an amplitude of a polarization isolation vector, thereby increasing polarization isolation.

In another possible implementation, the four ring structures form two polarization directions perpendicular to each other, the four ring structures include metal sheets parallel to the two polarization directions, the four ring structures include a third dipole and a fourth dipole, the third dipole and the fourth dipole are not adjacent to each other, the metal protrusion structure is disposed on a third metal sheet and a fourth metal sheet in the third dipole, the metal protrusion structure is disposed on a fifth metal sheet and a sixth metal sheet in the fourth dipole, and a vertex angle formed by the third metal sheet and the fourth metal sheet is opposite to a vertex angle formed by the fifth metal sheet and the sixth metal sheet.

For example, in some common scenarios, a radiating element may be a dual-polarized antenna. For example, a radiation surface is used as a horizontal plane, two polarization directions may be perpendicular to each other, and a metal sheet of the radiation surface of a dipole may be parallel or nearly parallel to one polarization direction. In this case, a metal protrusion structure may be disposed on two edges of two opposite included angles of the two dipoles. This increases mutual impedance between radiation surfaces and polarization isolation between the radiation surfaces of the dipoles. In this scenario, usually, a location of the metal sheet on which the metal protrusion structure is disposed is related to a polarization direction. For example, a metal protrusion structure may be added to a metal sheet on which two non-radiation arms (or referred to as metal arms) in one polarization direction are located, to increase polarization isolation.

The foregoing describes in detail the structure of the radiating element provided in this disclosure. The following describes in more detail the structure of the radiating element and the structure of the antenna provided in this disclosure with reference to the antenna.

The radiating element or antenna array provided in this disclosure may be classified into a plurality of cases, for example, a length direction of a metal sheet is parallel to a polarization direction, or a length direction of the metal sheet and a polarization direction form an included angle of 45 degrees. Some specific scenarios are used as examples for description below.

Scenario 1: A metal sheet and a polarization direction form an included angle of 45 degrees.

Figure 6:
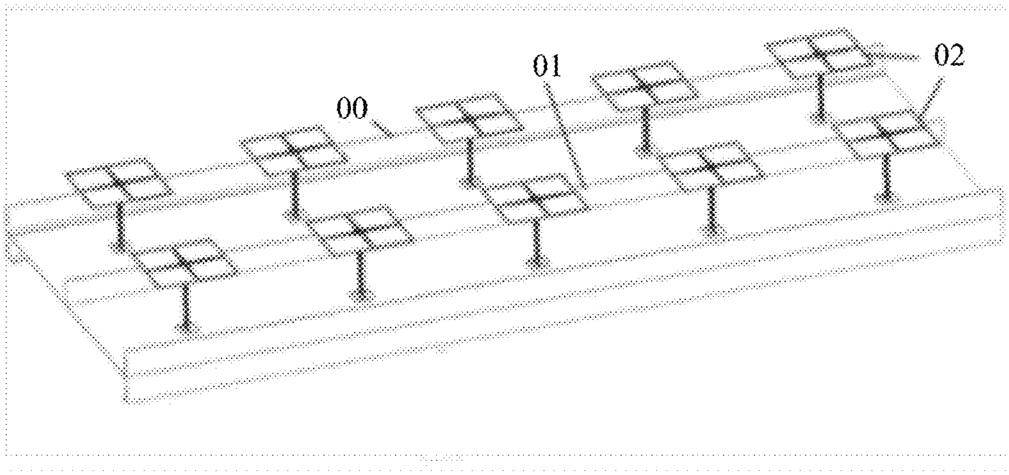
FIG. 6 is a schematic diagram of a structure of an antenna array according to an embodiment of this disclosure.

For example, as shown in FIG. 6, the antenna array provided in this disclosure is formed by two columns of low frequency radiating elements 02 disposed on a metal reflection plate 00 and a metal baffle 01 located between two columns of low frequency. A quantity of each column of low frequency elements may be determined based on a specific application scenario and a requirement. In this embodiment, each column of low frequency is formed by five radiating elements.

Figure 7:
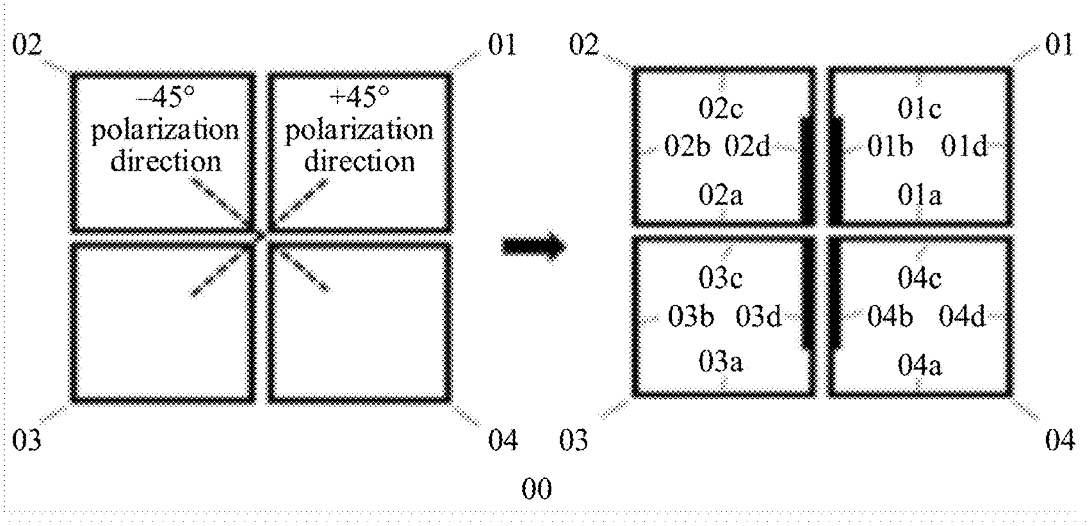
FIG. 7 is another schematic diagram of a structure of a radiating element according to an embodiment of this disclosure.

One of the radiating elements is used as an example. As shown in FIG. 7, the radiating element includes four square rings, and polarization directions of ±45° are formed. Diagonals of the four square rings may be parallel to one of the polarization directions. Specifically, a radiation surface of the radiating element may include square rings 01, 02, 03, and 04. Each square ring may include four metal sheets. The square ring 01 may include metal sheets 01*a*, 01*b*, 01*c*, and 01*d*; the square ring 02 may include metal sheets 02*a*, 02*b*, 02*c*, and 02*d*; the square ring 03 may include metal sheets 03*a*, 03*b*, 03*c*, and 03*d*, and the square ring 04 may include metal sheets 04*a*, 04*b*, 04*c*, and 04*d*. The metal square rings 01 and 03 form +45° polarization, and the metal square rings 02 and 04 form −45° polarization. For +45° polarization, metal stubs are loaded on the arm 01*b* of the square ring 01 and the arm 03*d* of the square ring 03, and the loaded metal stubs are shown as partial broadenings 01*b* and 03*d* in FIG. 7. A partial width becomes M0 times an original width of the arm, where 1<M0≤3. A length of the widened part is N0 times an original length of the arm, where 0.5≤N0≤1 (less than a width of 2*d*). For −45° polarization, metal stubs are loaded on the arm 02*d* of the square ring 02 and the arm 04*b* of the square ring 04, and the loaded metal stubs are shown as partial broadenings 02*d* and 04*b* in the schematic diagram. A partial width becomes P0 times an original width of the arm, where 1<P0≤3. A length of the widened part is Q0 times an original length of the arm, where 0.5≤Q0≤1.

Figure 8:
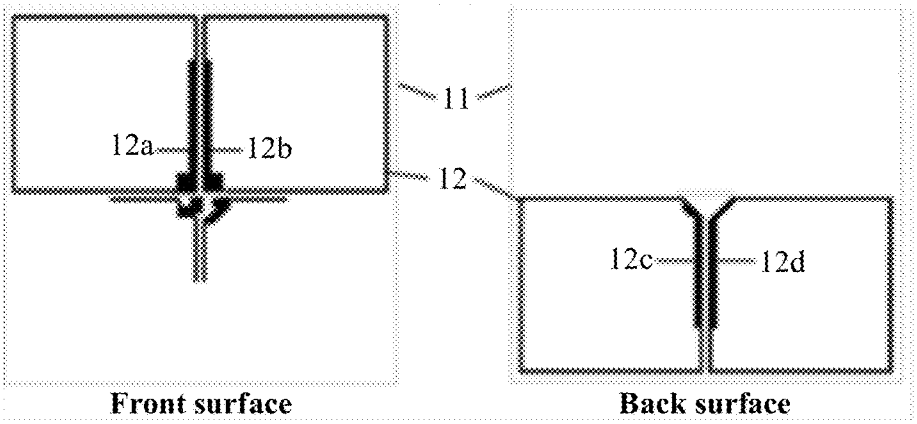
FIG. 8 is another schematic diagram of a structure of a radiating element according to an embodiment of this disclosure.

More specifically, an operating frequency band of a low frequency array in this embodiment may include 690 MHz to 960 MHz, and a radiation surface used by the low frequency array is shown in FIG. 8. The radiation surface is formed by a non-metallic dielectric substrate 11 and a metal strip line 12 attached to front and back surfaces of the radiation surface. A structure of the metal strip line 12 is similar to that in FIG. 7. A width of a metal strip line on which a metal protrusion structure is not disposed is 1 mm. Widths of parts 12*a*, 12*b*, 12*c*, and 12*d* of the metal strip line shown in FIG. 8 are 2 mm. Compared with a case in which the metal protrusion structure is not disposed on the radiation surface, a length of the strip line in the changed part is approximately ⅚ of an original length. Compared with a radiation surface on which the metal protrusion structure is not disposed, the radiation surface on which the metal protrusion structure is disposed can improve polarization self-isolation of a low frequency element or even a low frequency array.

Therefore, the stubs are loaded on the radiation surface of the element, so that the radiating metal arms are partially widened. In this way, an amplitude or a phase of a polarization isolation vector is changed. This can improve polarization self-isolation of the element, thereby improving polarization self-isolation of the antenna array.

Scenario 2: A metal sheet is parallel to a polarization direction.

Figure 9:
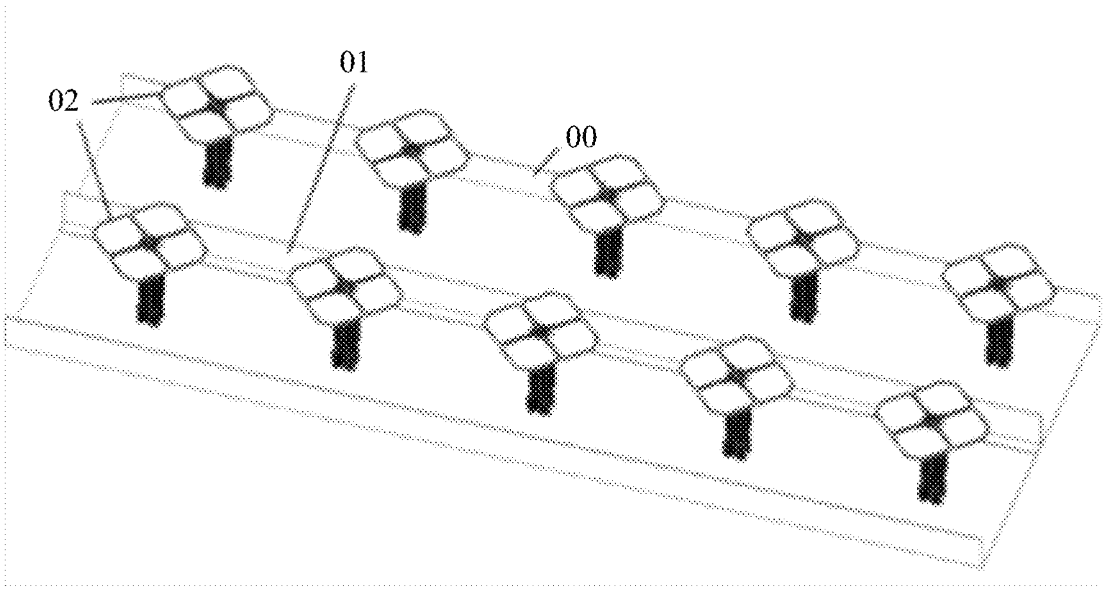
FIG. 9 is another schematic diagram of a structure of an antenna array according to an embodiment of this disclosure.

As shown in FIG. 9, the antenna array provided in this disclosure is formed by two columns of low frequency radiating elements 02 disposed on a reflection plate 00 and a metal baffle 01 located between two columns of low frequency. A quantity of each column of low frequency elements may be determined based on a specific application scenario and a requirement. In this embodiment, each column of low frequency has five radiating elements.

Figure 10:
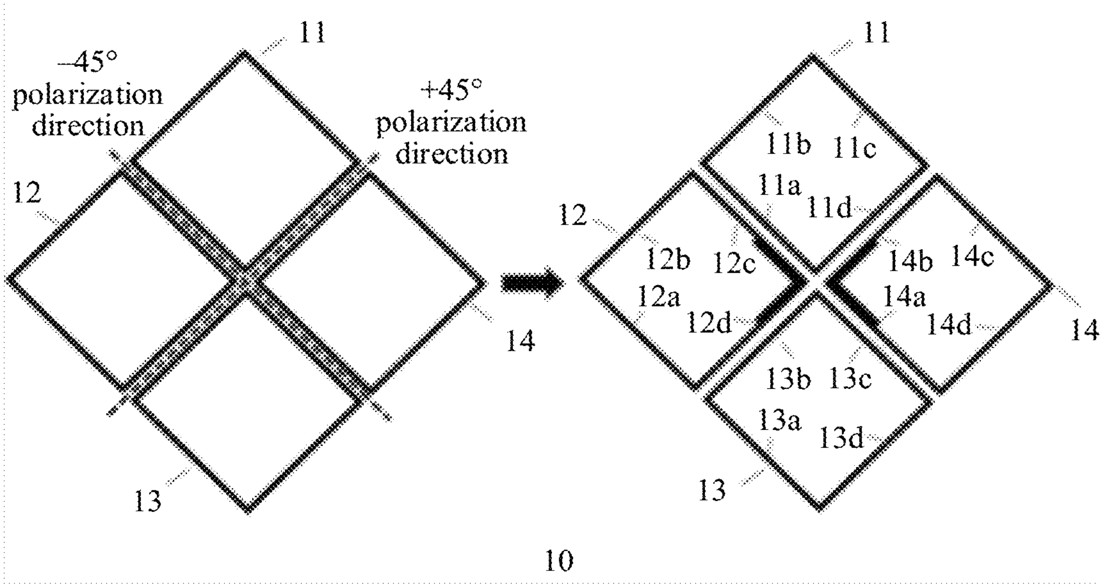
FIG. 10 is another schematic diagram of a structure of a radiating element according to an embodiment of this disclosure.

One of the radiating elements is used as an example. As shown in FIG. 10, the radiating element includes four square rings, and polarization directions of ±45° are formed. Diagonals of the four square rings may be parallel to one of the polarization directions. Specifically, similar to FIG. 6, a radiation surface of the radiating element may include square rings 01, 02, 03, and 04. Each square ring may include four metal sheets. The square ring 11 may include metal sheets 11*a*, 11*b*, 11*c*, and 11*d*; the square ring 12 may include metal sheets 12*a*, 12*b*, 12*c*, and 12*d*; the square ring 13 may include metal sheets 13*a*, 13*b*, 13*c*, and 13*d*; and the square ring 14 may include metal sheets 14*a*, 14*b*, 14*c*, and 14*d*. The metal arms 11*a*, 11*b*, 12*b*, 12*c*, 14*a*, 14*d*, 13*c* and 13*d* form +45° polarization, where 11*b*, 14*d*, 12*b*, 13*d* are radiation arms. The metal arms 11*d*, 11*c*, 14*b*, 14*c*, 12*d*, 12*a*, 13*b* and 13*a* form −45° polarization, where 11*c*, 14*c*, 12*a*, 13*a* are radiation arms. For +45° polarization, metal stubs are loaded on the metal arm 12*c* of the square ring 12 and the arm 14*a* of the square ring 14, and the loaded metal stubs are shown as partial broadenings 12*c* and 14*a* in FIG. 9. A partial width becomes M1 times an original width of the arm, where 1<M1≤3. A length of the widened part is N1 times an original length of the arm, where 0.5≤N1≤1. For −45° polarization, metal stubs are loaded on the metal arm 12*d* of the square ring 12 and the arm 14*b* of the square ring 14, and the loaded metal stubs are shown as partial broadenings 12*d* and 14*b* in the schematic diagram. A partial width becomes P1 times an original width of the arm, where $1<P1\leq 3$. A length of the widened part is Q1 times an original length of the arm, where $0.5\leq Q1\leq 1$.

Figure 11:
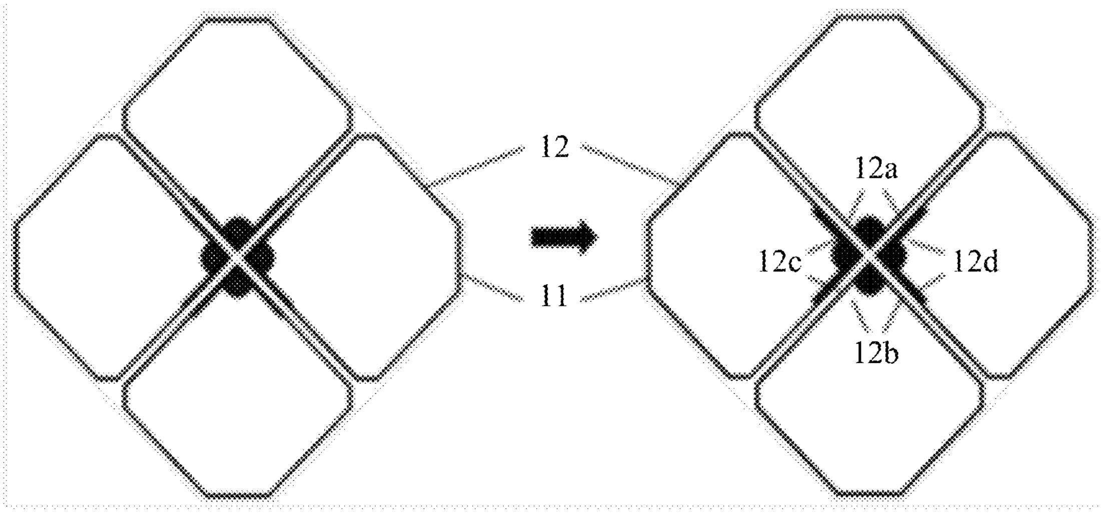
FIG. 11 is another schematic diagram of a structure of a radiating element according to an embodiment of this disclosure.

More specifically, as shown in FIG. 11, an operating frequency band of a low frequency array in this embodiment may include 690 MHz to 960 MHz. A radiation surface is formed by a non-metallic dielectric substrate 11 and a metal strip line 12 attached to front and back surfaces of the radiation surface. A structure of the metal strip line 12 is similar to that in FIG. 7. A difference between the metal strip line before change and the metal strip line after change is parts 12*a*, 12*b*, 12*c*, and 12*d* of the metal strip line in the figure, where 12*a* and 12*b* are 1 mm wider than the parts of the metal strip line before change, 12*c* and 12*d* are 1.2 mm narrower than the parts of the metal strip line after change, and a length of the change is 10 mm. Compared with a radiation surface to which the metal protrusion structure is not added, the radiation surface provided in this disclosure can improve polarization self-isolation of a low frequency element or even a low frequency array.

The foregoing describes the radiating element provided in embodiments of this disclosure. The radiating element may be arranged on an antenna array. Specifically, the antenna array provided in this disclosure may include a reflection plate and one or more radiating elements. The one or more radiating elements are arranged on the reflection plate. Specifically, a low frequency dipole and a high frequency dipole may be arranged alternately.

Figure 12:
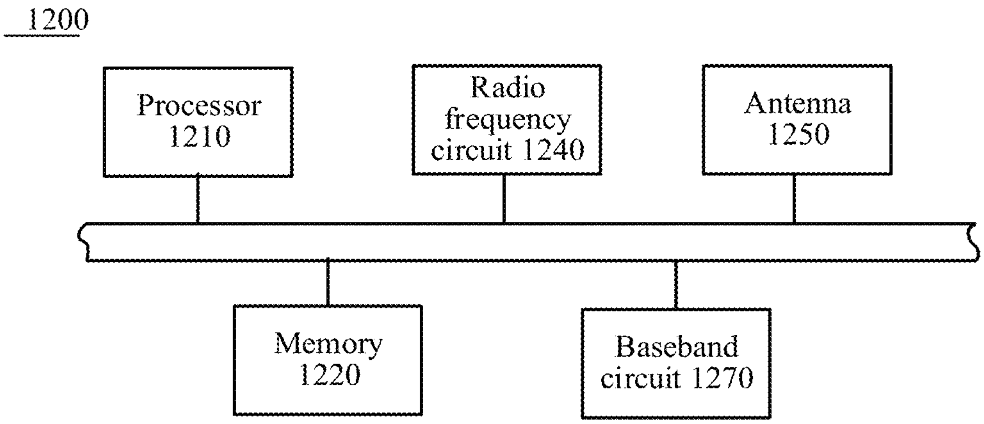
FIG. 12 is a schematic diagram of a structure of a network device according to an embodiment of this disclosure.

The radiating element or the antenna array provided in embodiments of this disclosure may be further applied to various network devices with a wireless communication function, for example, a terminal or a base station. For example, a structure of the network device may be shown in FIG. 12.

The network device 1200 includes a processor 1210, a memory 1220, a baseband circuit 1270, a radio frequency circuit 1240, and an antenna 1250, where the processor 1210, the memory 1220, the baseband circuit 1270, the radio frequency circuit 1240, and the antenna 1250 are connected through a bus or another connection apparatus. The memory 1220 stores corresponding operation instructions. The processor 1210 controls, by executing the foregoing operation instructions, the radio frequency circuit 1240, the baseband circuit 1270, and the antenna 1250 to work, to perform corresponding operations. For example, the processor 1210 may control the radio frequency circuit to generate a synthesized signal, and then radiate a signal in a first frequency band and a signal in a second frequency band through an antenna. The antenna may include the antenna array or the radiating element provided in this disclosure.

The foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments, or make equivalent replacements to some technical features thereof, without departing from the scope of the technical solutions of embodiments of this disclosure.

What is claimed is:

1. A radiating element, comprising at least one dipole and a reflection plate, wherein the at least one dipole is disposed on a surface of the reflection plate; and each of the at least one dipole comprises a radiation surface, the radiation surface comprises a plurality of metal sheets forming a ring shape, at least two of the plurality of metal sheets of the at least one dipole are covered with a metal protrusion structure, and a length of the metal protrusion structure is less than lengths of the covered metal sheets;

wherein the at least one dipole comprises four ring structures formed by the plurality of metal sheets, and the four ring structures are pairwise opposite; and wherein the four ring structures form two polarization directions perpendicular to each other, the four ring structures comprise metal sheets parallel to the two polarization directions, the four ring structures comprise a third ring structure and a fourth ring structure, the third ring structure and the fourth ring structure are not adjacent to each other, the metal protrusion structure is disposed on a third metal sheet and a fourth metal sheet in the third ring structure, the metal protrusion structure is disposed on a fifth metal sheet and a sixth metal sheet in the fourth ring structure, and a vertex angle formed by the third metal sheet and the fourth metal sheet is opposite to a vertex angle formed by the fifth metal sheet and the sixth metal sheet.

2. The radiating element according to claim 1, wherein the metal protrusion structure covered on the at least one dipole is an integrally formed structure.

3. The radiating element according to claim 1, wherein the metal protrusion structure covered on the at least one dipole is a metal patch.

4. The radiating element according to claim 1, wherein the four ring structures form two polarization directions perpendicular to each other, the two polarization directions are not parallel to the metal sheets of the four ring structures, the four ring structures comprise a first ring structure and a second ring structure, the metal protrusion structure is disposed on both a first metal sheet in the first ring structure and a second metal sheet in the second ring structure, and the first metal sheet is adjacent to the second metal sheet.

5. The radiating element according to claim 1, wherein the length of the metal protrusion structure is within a range of 0.1 to 0.25 times of a wavelength corresponding to a center frequency of the radiating element, and a height of the metal protrusion structure is within a range of 1 to 2 times of thicknesses of the covered metal sheets.

6. The radiating element according to claim 1, wherein each dipole further comprises a feeding structure, four metal sheets comprised in each ring structure are connected to the reflection plate by using the feeding structure, and the feeding structure is for transmitting an electrical signal.

7. An antenna array, comprising a reflection plate and at least two radiating elements arranged on the reflection plate, wherein at least one of the at least two radiating elements comprises at least one dipole, each of the at least one dipole comprises a radiation surface that has a plurality of metal sheets forming a ring shape, at least two of the plurality of metal sheets of the at least one dipole are covered with a metal protrusion structure, and a length of the metal protrusion structure is less than lengths of the covered metal sheets;

wherein the at least one dipole comprises four ring structures formed by the plurality of metal sheets, and the four ring structures are pairwise opposite; and wherein the four ring structures form two polarization directions perpendicular to each other, the four ring structures comprise metal sheets parallel to the two polarization directions, the four ring structures comprise a third ring structure and a fourth ring structure, the third ring structure and the fourth ring structure are not adjacent to each other, the metal protrusion structure is disposed on a third metal sheet and a fourth metal sheet in the third ring structure, the metal protrusion structure is disposed on a fifth metal sheet and a sixth metal sheet in the fourth ring structure, and a vertex angle formed by the third metal sheet and the fourth metal sheet is opposite to a vertex angle formed by the fifth metal sheet and the sixth metal sheet.

8. The antenna array according to claim 7, wherein the metal protrusion structure covered on the at least one dipole is an integrally formed structure.

9. The antenna array according to claim 7, wherein the metal protrusion structure covered on the at least one dipole is a metal patch.

10. The antenna array according to claim 7, wherein the at least one dipole is disposed on a top of a feeding structure fixed on the reflection plate.

11. A network device comprising a radiating element, wherein the radiating element comprises a reflection plate and at least one dipole disposed on a surface of the reflection plate; wherein each of the at least one dipole comprises a radiation surface that has a plurality of metal sheets forming a ring shape, at least two of the metal sheets of the at least one dipole are covered with a metal protrusion structure, and a length of the metal protrusion structure is less than lengths of the covered metal sheets;

wherein the at least one dipole comprises four ring structures formed by the plurality of metal sheets, and the four ring structures are pairwise opposite; and wherein the four ring structures form two polarization directions perpendicular to each other, the four ring structures comprise metal sheets parallel to the two polarization directions, the four ring structures comprise a third ring structure and a fourth ring structure, the third ring structure and the fourth ring structure are not adjacent to each other, the metal protrusion structure is disposed on a third metal sheet and a fourth metal sheet in the third ring structure, the metal protrusion structure is disposed on a fifth metal sheet and a sixth metal sheet in the fourth ring structure, and a vertex angle formed by the third metal sheet and the fourth metal sheet is opposite to a vertex angle formed by the fifth metal sheet and the sixth metal sheet.

12. The network device according to claim 11, wherein the metal protrusion structure covered on the at least one dipole is an integrally formed structure.

13. The network device according to claim 11, wherein the metal protrusion structure covered on the at least one dipole is a metal patch.

14. The network device according to claim 11, wherein the four ring structures form two polarization directions perpendicular to each other, the two polarization directions are not parallel to the metal sheets of the four ring structures, the four ring structures comprise a first ring structure and a second ring structure, the metal protrusion structure is disposed on both a first metal sheet in the first ring structure and a second metal sheet in the second ring structure, and the first metal sheet is adjacent to the second metal sheet.

* * * * *